US005607093A

United States Patent [19]
Geier

[11] Patent Number: 5,607,093
[45] Date of Patent: Mar. 4, 1997

[54] ELONGATED CARRIER SUPPORT APPARATUS FOR SECURING ITEMS TO THE ROOF OR LUGGAGE RACK OF A VEHICLE

[76] Inventor: William F. Geier, P.O. Box 1308, Rte. #1, White Stone, Va. 22578

[21] Appl. No.: 490,172

[22] Filed: Jun. 14, 1995

Related U.S. Application Data

[63] Continuation-in-part of Ser. No. 417,192, Apr. 5, 1995, abandoned.

[51] Int. Cl.$^6$ ............................................. B60R 9/00
[52] U.S. Cl. ........................... 224/318; 224/319; 224/324; 224/572; 224/917.5
[58] Field of Search .................................. 224/318, 314, 224/319, 324, 572, 917.5, 922

[56] References Cited

U.S. PATENT DOCUMENTS

| | | | |
|---|---|---|---|
| 2,409,841 | 10/1946 | Donkin ........................................ | 136/6 |
| 2,409,946 | 10/1946 | MacLeod. | |
| 3,313,511 | 4/1967 | Koerner et al. ..................... | 224/318 X |
| 4,733,809 | 3/1988 | Pursell ..................................... | 224/329 |
| 4,805,937 | 2/1989 | Boucher et al. ..................... | 224/572 X |
| 4,817,838 | 4/1989 | Kamaya ..................................... | 224/319 |
| 5,067,644 | 11/1991 | Coleman ................................ | 224/324 |
| 5,096,107 | 3/1992 | Van Son .................................. | 224/338 |

*Primary Examiner*—Renee S. Luebke
*Attorney, Agent, or Firm*—Kerkam, Stowell, Kondracki & Clarke P.C.; Edward J. Kondracki

[57] ABSTRACT

A carrier device for supporting and securing different objects to a luggage rack of a vehicle or directly to the roof of a vehicle which does not have a luggage rack. The device includes a carrier fabric on which one side is covered along its length with loops and one half with barbs. The fabric is formed with cushioned straps on one half opposite either the hooks or barbs. The fabric may be placed onto a luggage rack bar across the width of a vehicle, and skis, fishing poles or the like can be secured by the straps to the support carrier. Alternatively, the carrier device may be secured directly to a vehicle roof which does not have a luggage rack. To this end, the carrier device is wrapped around a filler member and end straps with hooks thereon are provided and designed to connect to a vehicle gutter or other part of the vehicle body such as the lip of the roof.

25 Claims, 4 Drawing Sheets

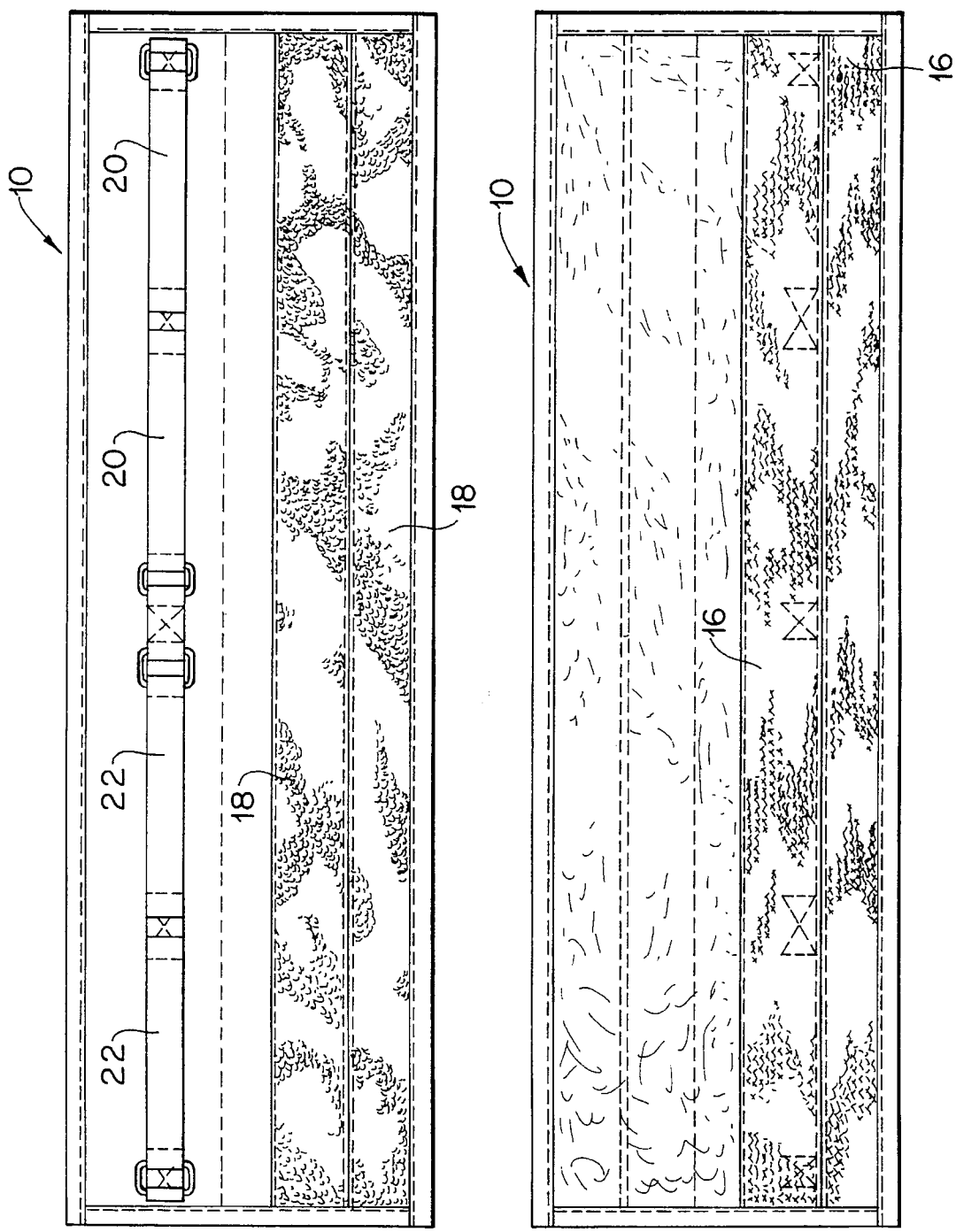

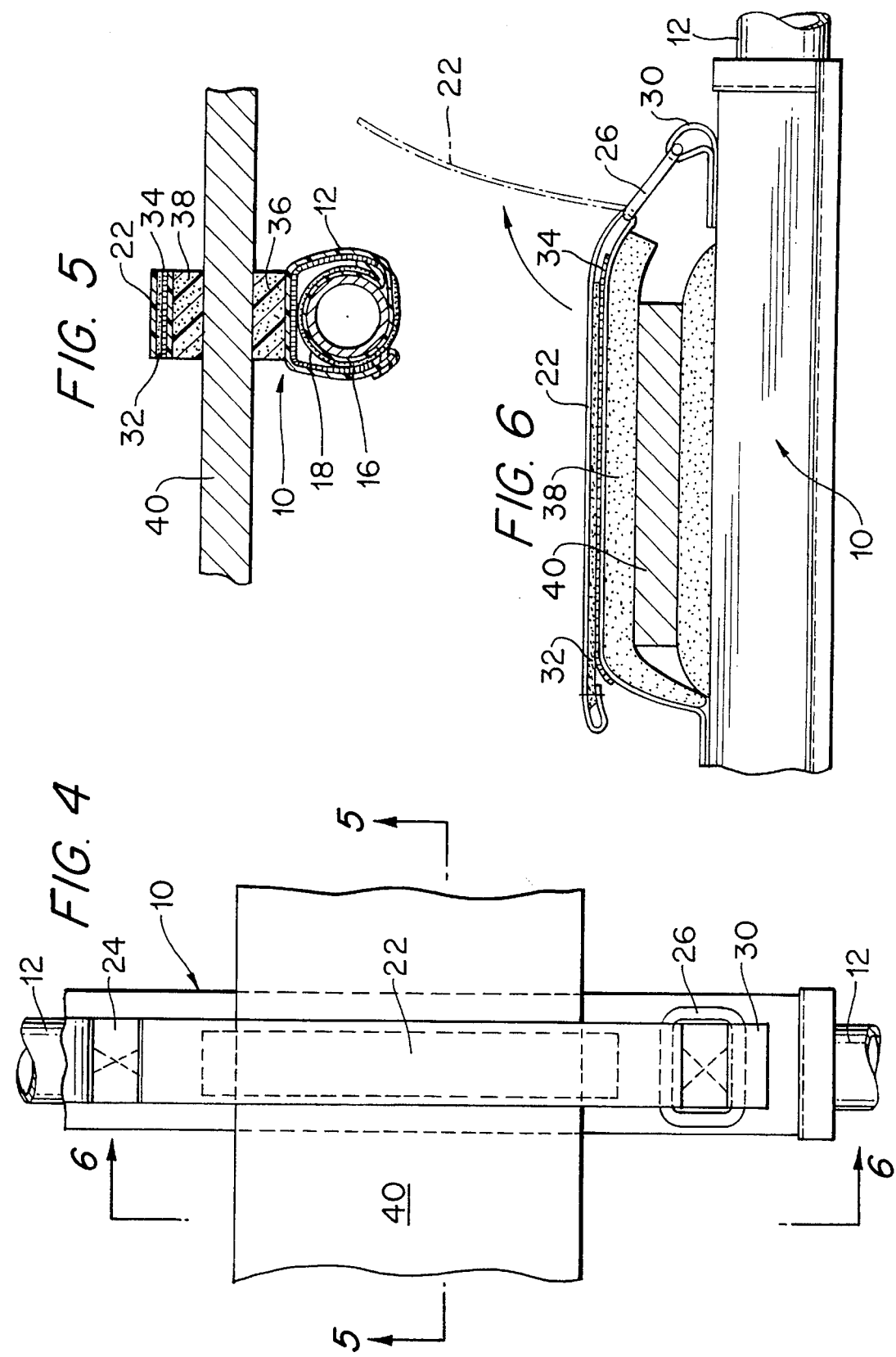

ELONGATED CARRIER SUPPORT APPARATUS FOR SECURING ITEMS TO THE ROOF OR LUGGAGE RACK OF A VEHICLE

CROSS-REFERENCE TO RELATED APPLICATION

This application is a continuation-in-part of application Ser. No. 08/417,192, filed Apr. 5, 1995, and now abandoned, in the name of William F. Geier, the inventor herein and entitled "An Elongated Barrier Support Fabric For Securing Different Items To A Luggage Rack Of A Vehicle.

BACKGROUND OF THE INVENTION

This invention is directed to a carrier apparatus for securing an item such as snow skis, water skis, fishing rods and the like to the roof or to a luggage carrier of a vehicle, and, more particularly, to a carrier apparatus which protects the roof, luggage rack and the item being carried therewith.

Luggage racks are old in the art and different systems have been used to secure articles to a luggage rack or to the roof of a vehicle. Such systems have been patented such as set forth in the following U.S. Pat. Nos.: 2,409,946; 4,733,809; 4,817,838; 5,067,644; 5,096,107; and EPO 003,195. Some of these patents do not require a luggage rack and are secured to the gutter by a hook and strap. Others make use of means to secure the carrier to a luggage rack which are time consuming and require considerable effort to secure the devices onto the top of the vehicle.

SUMMARY OF THE INVENTION

It is therefore an object of the invention to provide a carrier device which can be secured onto a top of a vehicle in a very short time.

A more particular object of the invention is to provide a carrier device for use with various items, which device can be used in conjunction with a vehicle luggage carrier or directly on the roof of a vehicle without a luggage carrier.

Another object is to provide a carrier device which protects against damage to the top of the vehicle and to the item being carried.

Still another object is to provide a carrier support which can be easily installed by any person able to reach the top of a vehicle and without any special tools.

BRIEF DESCRIPTION OF THE DRAWINGS

FIG. 1 illustrates a first embodiment of a strap and loop side of the carrier device for securing different items to a luggage carrier of vehicle.

FIG. 2 illustrates a barb side of the carrier device of FIG. 1.

FIG. 4 is an enlarged view illustrating one strap portion of one of the carrier devices of FIG. 3, wherein the carrier device is secured to a rod of a luggage carrier.

FIG. 5 illustrates a cross-sectional view along lines 5—5 of FIG. 4.

FIG. 6 illustrates a cross-sectional view along lines 6—6 of FIG. 4.

DETAILED DESCRIPTION OF THE INVENTION

Figure 3:
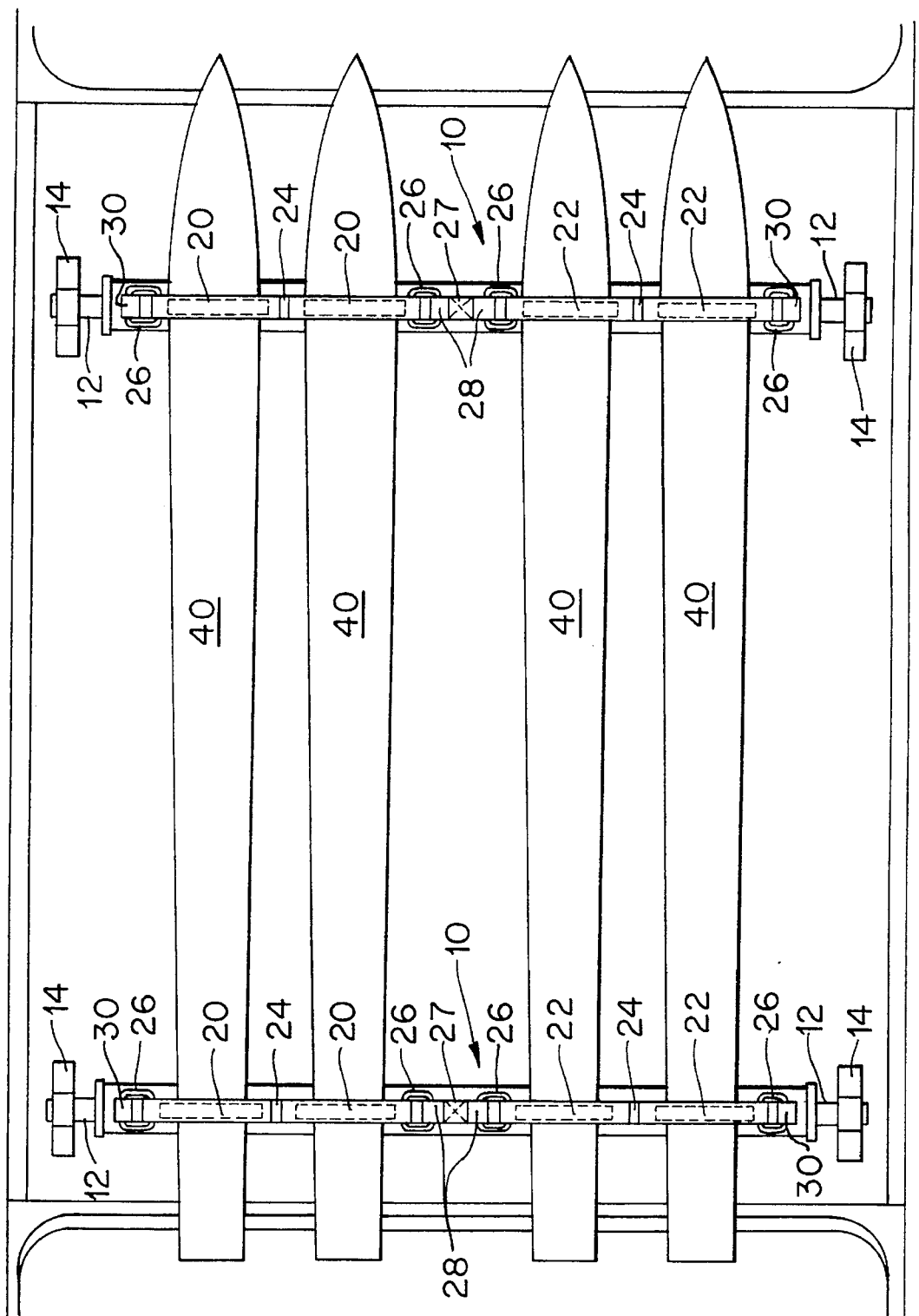
FIG. 3 illustrates a pair of carrier devices of FIG. 1 connected about the rods of a luggage carrier and securing two pair of skis thereon.

Referring to the drawings, wherein like reference numerals designate similar parts throughout the various views, there is shown a preferred embodiment of the carrier device 10 of the present invention. The device 10 includes a support fabric which may be waterproofed to prevent water from penetrating the fabric. FIGS. 1 and 2 illustrate a top side and a bottom side of the carrier device, respectively. As shown in FIG. 1, the top side has a plurality of straps 20 secured onto one half of the fabric and extending along the length thereof. The remaining half is covered with loops 18 of a VELCRO-like fastener. FIG. 2 illustrates the bottom side, one half of which is covered with barbs 16 of a VELCRO-like fastener, and the adjacent half is a felt material or some other non-abrasive material. FIG. 3 illustrates two parallel bars 12 which are secured to the upper surface of a vehicle by any suitable means 14. The luggage rack or bars 12 form no part of this invention, but the carrier device may optionally be used in conjunction with the luggage rack. The carrier device fabric has an upper surface, a lower surface, and a length and width. The lower surface is provided with barbs 16 along at least a portion of the length and width of one half of the lower surface of the support fabric, and is preferably provided with a soft material on at least a portion of the width and length of the other half of the bottom surface. The upper surface of the support fabric is provided with two pairs of straps 20, 22, wherein each of the pairs is secured to the upper surface of the fabric between an edge and a mid line by a securing means 24 positioned at a mid-point of their length, with the length of the pairs of straps along the length of the support fabric. A pair of straps 28 are secured to the upper surface of the support fabric at a midpoint 27 of the length on a line with the two pair of straps 20, 22. A buckle 26 is secured to each loose end of the straps 28. At opposite ends of the upper surface in alignment with the two pairs of straps, straps 30 secure a buckle 26. The buckles 26 at the ends and at the middle of the fabric length are spaced equally from the mid-point 24 of the two pairs of straps.

As shown more clearly in FIG. 6, each pair of straps 20, 22 has one end secured to the fabric at 24, and is sufficiently long in length to feed through a buckle 26 and then fold back upon itself so that loops 32 and barbs 34 of a VELCRO-like connector cooperate to hold the strap in place. In order to protect the bottom surface of the snow ski or other item being held in place by the strap, a cushion 36 is secured to the device between the midpoint connection 24 and the buckle strap holder 28, 30. Also, in order to protect the upper surface of the snow ski or other item being held in place, a protective cushion 38 is secured to the bottom of substantially one-half the length of the strap 22 between the securing point 24 and a portion toward the buckle 26 to which the strap is to be connected, as shown in FIG. 6. Preferably each of the straps of each pair of straps 20, 22 are provided with VELCRO-like connectors and cushions as shown in FIG. 6. As shown in FIG. 3, a pair of the instant carrier devices can be used to support two pairs of skis 40.

In one preferred embodiment, the carrier device 10 is looped onto a luggage bar 12 and folded back upon itself so that the bar 12 is contained within the fabric carrier support and the halves with the barbs and loops are secured together to encompass the bar. Of course, the carrier device is connected onto the bar with the pairs of support straps outwardly of or above the luggage rack rod. If the support straps are secured onto the buckles, the support straps are unsecured by removing the pairs of straps from the buckles. The support carrier is now ready to secure the skis or other items in place. Two such carrier supports are necessary to protect the skis. Therefore, a support carrier would be secured on spaced bars near each end of the skis. With the straps in an unsecured position the skis are laid upon the bottom cushion 36 of each strap holder. Then the loose end of each strap is fed through the buckle with the strap over the upper surface of the ski. The upper cushion 38 will be over the upper surface of the ski and the end of the strap is fed through the buckle from the bottom side of the buckle when facing the ski. The strap is then pulled through the buckle and secured upon itself so that the barbs and loops on the strap will adhere to each other. The strap is tightened upon the ski so that the ski will be supported and held in place. The ski will be protected on its upper and lower surfaces by the cushions 36 and 38 and the strap will hold the ski in place. In order to remove the ski, it is only necessary to unbuckle the straps.

The carrier support has been shown with two pair of skis. It would be obvious that any number of fishing rods could be carried by the carrier device. If the support rod is of sufficient length more than two pairs of skis could be carried by providing additional holding straps.

Since the carrier support is folded back upon itself it is advisable to have the fold end in the direction in which the vehicle is to travel. This way, it would hardly be possible that the carrier support would open and lose the device being transported.

In making the carrier device, the straps and buckles are secured to one side of one-half the fabric along a length thereof. Loops are applied to the other half on the same side as the straps. Barbs are secured to one half of the opposite surface of the carrier support. The carrier support is rolled onto the bar along its length and the barbs and loops will be secured to each other with the pairs of straps on one half of the outer portion of the surface above the bar. The carrier support is then ready for use. The edges of the support fabric can be provided with a binding to protect and strengthen the edges.

The above description has been set forth for a support fabric for use with a luggage rack which has a forward bar and a rearward parallel bar which extend across the top and is secured by any suitable manner. It is well-known that some luggage racks have a wire construction or a bar construction secured to the front and rear bars. If such a rack is used then the bottom of the fabric could have a plurality of slits that extend from the outer edges up to a point near the straps so that the sections formed by the slit can fit between and around the wires and be secured together. If the luggage rack has bars or a somewhat large construction between the bars then slots can be formed in the support fabric so that the sections between the slots can fit between the bars that are secured between the front and rear bars. These slits or slots can be formed when manufactured for a specific luggage rack or the slits and/or slots can be cut for the luggage rack then secured on the vehicle by slitting or slotting the support fabric at the proper place so that the bottom half and upper half can be secured together, such as with a VELCRO-like connection.

Figure 7:
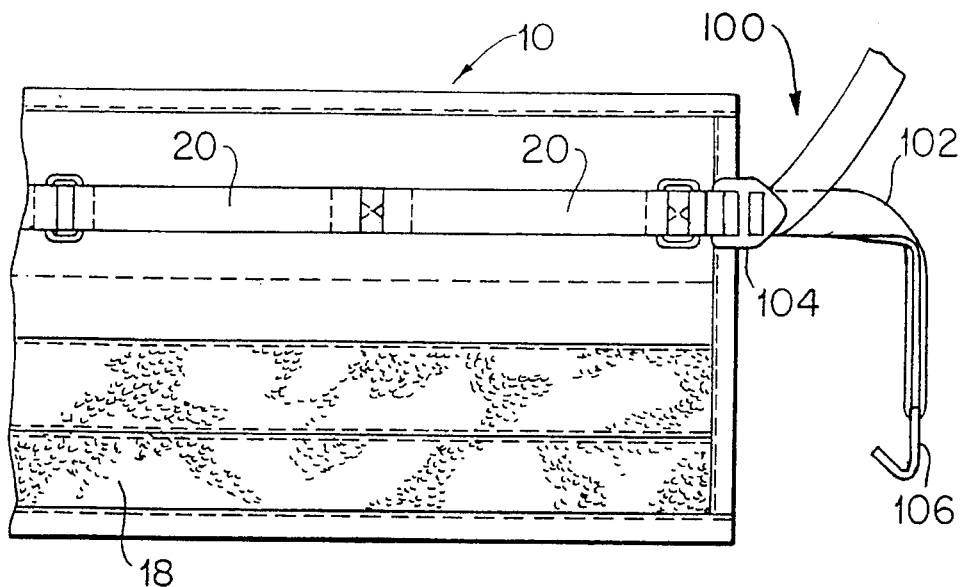
FIG. 7 illustrates a partial view of an alternative embodiment of the instant invention particularly adapted for use on a vehicle which does not have a luggage carrier.
Figure 8:
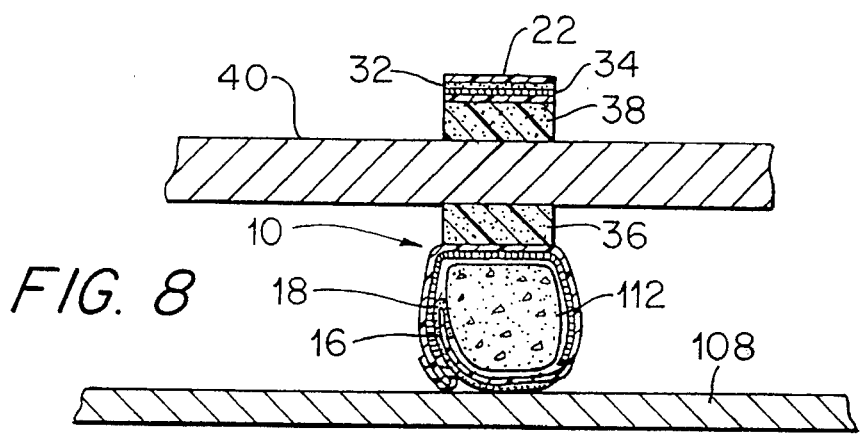
FIG. 8 is a view similar to that of FIG. 5, illustrating the device of FIG. 7 mounted directly on the roof of a vehicle.
Figure 9:
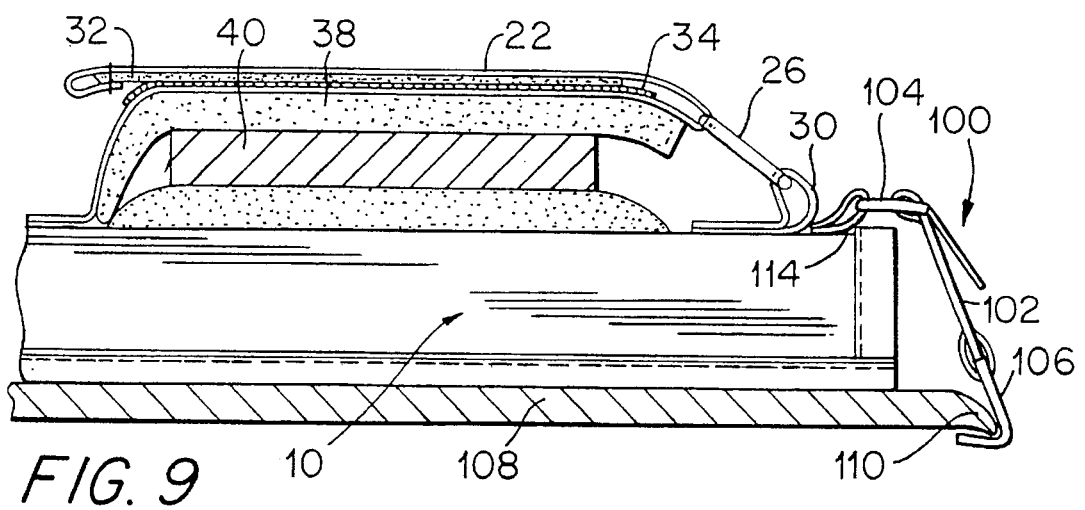
FIG. 9 is a view similar to that of FIG. 6, illustrating the device of FIG. 7 connected to the roof of a vehicle via straps and hooks which cooperate with the gutter or the like on the vehicle.

Referring now to FIGS. 7–9, an alternative embodiment of instant invention is shown which includes an adjustable strap and hook device 100 on each end of the carrier device 10, particularly adapted for use on a vehicle which does not have a luggage carrier, rack, or bar.

The strap and hook device 100 preferably includes an adjustable strap 102 secured at one end to a first connector or buckle 104 for connecting the strap 102 to the carrier fabric. The buckle 104 or strap 102 may be connected to strap 30 or separately fastened to the carrier fabric adjacent strap 30. A hook or clip 106 is secured to the other end of strap 102. The hook or clip 106 is particularly constructed to hook around a lip 110 typically provided on a vehicle roof 108 over the vehicle doors. Alternatively, the hook or clip 106 may connect to the vehicle door frame in a known manner, or to a longitudinal gutter of runner when present. While FIGS. 7 and 9 only show one side portion of the carrier device 10, it is understood that a similar strap and hook device 100 is provided on both ends of the carrier device, to enable the carrier device to be securely connected to the roof 108 of the vehicle. The strap 102 is preferably adjustable to enable the carrier device to be secured to a variety of size and shaped vehicle roofs 108.

As shown in FIG. 8, a filler device 112, such as an elongated piece of foam or rubber material is provided, around which the carrier fabric is wrapped in order to maintain the desired shape of the carrier device and to space the items carried therewith from the roof 108 of the vehicle. Any other type of filler device 112, such as a stick, broom handle, rod or pipe, may alternatively be used to maintain the desired shape of the carrier device.

As will be understood from the description set forth above, the instant carrier device can be interchangeably used on vehicles with and without a luggage carrier, by selectively inserting or removing the filler device 112 and connecting or disconnecting the strap and hook devices 100, thereby providing an extremely versatile carrier device which can be used on almost any vehicle for carrying a variety of elongated items.

While the preferred forms and embodiments of the invention have been illustrated and described, it will be apparent to those of ordinary skill in the art that various changes and modifications may be made without deviating from the invention concepts and spirit of the invention as set forth above, and it is intended by the appended claims to define all such concepts which come within the full scope and true spirit of the invention.

What is claimed:

1. A carrier apparatus for supporting an elongated object on the roof of a vehicle, said device comprising:

a support fabric, said support fabric having a width and length, and an upper surface and a lower surface, a plurality of barbs covering at least a portion of at least a half of the width and length of said width and length of said lower surface of said fabric, a soft material covering at least a portion of another half of said lower surface of said width and length of said fabric, a plurality of loops covering at least a portion of at least one half of the width and length of said upper surface of said fabric, at least one strap secured by a first securing means to another half portion of said upper surface of said fabric between one edge and a center line with said at least one strap extending along a length of said fabric and having a free end and at least one linear portion having an upper surface and a lower surface, a second strap securing means secured to said upper surface of said fabric and spaced from said first securing means a distance equal to approximately one-half the length of said linear portion and directed in a direction of said at least one linear portion having a free end, said at least one linear portion of said at least one strap includes barbs on the upper surface thereof which extend from juxtaposed said first securing means along a portion of about one half of a length of said at least one linear portion, said at least one linear portion of said at least one strap includes loops on the lower surface thereof beginning at about said free end and extending along said lower surface of said at least one linear portion to about one half the length thereof, and whereby said at least one linear portion can be secured to said second securing means and folded back upon itself so that the barbs and loops secure said at least one portion of said strap in place above the upper surface of said fabric.

2. A carrier apparatus as defined in claim 1, wherein said at least one strap includes first and second linear strap portions; as set forth for said at least one linear portion in which said first and second linear portions have a loose end that extends in opposite directions from said first securing means, a third securing means which is spaced from said first securing means in a direction opposite from that of said second securing means with said third securing means spaced a same distance from said first securing means as said second securing means.

3. A carrier apparatus as defined in claim 2, further including a plurality of pairs of said first and second linear strap portions.

4. A carrier apparatus as defined in claim 2, further including a hook and strap device secured to each opposite end of said support fabric, respectively, for securing said carrier apparatus to a vehicle top by hooking said hook and strap device onto a gutter of said vehicle.

5. A carrier apparatus as defined in claim 2, further including a hook and strap device secured to each opposite end of said support fabric, respectively, for securing said carrier apparatus to a vehicle top by hooking said hook and strap device onto an upper portion of a door frame of said vehicle.

6. A carrier apparatus as defined in claim 2, wherein said support fabric is operable to wrap around a rod on a luggage carrier of said vehicle.

7. A carrier apparatus as defined in claim 2, wherein said upper surface of said support fabric includes a third protective cushion affixed thereto along an area between said first and third securing means.

8. A carrier apparatus as defined in claim 7, further including a plurality of pairs of first and second linear strap portions.

9. A carrier apparatus as defined in claim 2, wherein said first and second linear portions include a cushion on a lower portion thereof between said first securing means and said third securing means.

10. A carrier apparatus as defined in claim 9, further including a plurality of pairs of first and second linear strap portions.

11. A carrier apparatus as defined in claim 9, wherein said upper surface of said support fabric includes a third protective cushion affixed thereto along an area between said first and third securing means.

12. A carrier apparatus as defined in claim 11, further including a plurality of pairs of first and second linear strap portions.

13. A carrier apparatus as defined in claim 1, wherein said upper surface of said support fabric includes a first protective cushion affixed thereto along an area between said first and second securing means.

14. A carrier apparatus as defined in claim 1, wherein said at least one strap includes a second cushion affixed onto a lower surface of the strap portion between said first and second securing means.

15. A carrier apparatus as defined in claim 14, wherein said upper surface of said support fabric includes a first protective cushion affixed thereto along an area between said first and second securing means.

16. A carrier apparatus as defined in claim 1, further including a hook and strap device secured to each opposite end of said support fabric, respectively, for securing said carrier apparatus to a vehicle top by hooking said hook and strap device onto a gutter of said vehicle.

17. A carrier apparatus as defined in claim 1, further including a hook and strap device secured to each opposite end of said support fabric, respectively, for securing said carrier apparatus to a vehicle top by hooking said hook and strap device onto an upper portion of a door frame of said vehicle.

18. A carrier apparatus as defined in claim 1, wherein said support fabric is operable to wrap around a rod on a luggage carrier of said vehicle.

19. A carrier as defined in claim 1, further including side straps extending from opposite sides of the carrier having clips at free ends thereof for securing the carrier to the roof of a vehicle.

20. A carrier apparatus as defined in claim 1, further including an elongated filler about which said support fabric is wrapped for maintaining the shape of the carrier apparatus while supporting an object on the roof of a vehicle.

21. A carrier apparatus as defined in claim 1, including side straps extending from opposite sides of the carrier having means at free ends thereof for securing the carrier to the roof of a vehicle.

22. A carrier for supporting elongated articles on the roof of a vehicle, said carrier comprising:

a support fabric substantially rectangular in shape and having an upper surface and a lower surface, a plurality of barbs extending lengthwise along at least a portion of at least one half of said lower surface of said fabric, a soft material extending lengthwise along at least a portion of another half of said lower surface of said fabric, a plurality of loops extending lengthwise along at least portion of at least one half of the upper surface of said fabric, a first and second strap each secured at one of its ends to another half portion of said upper surface of said fabric between one edge and a center line extending along the length of said fabric, said first and second straps each having at least one linear portion having an upper surface, a lower surface, and a free end, said second strap being spaced from said first strap, said first and second straps including barbs on the upper surface thereof and loops on the lower surface thereof whereby said straps can be folded back upon themselves so that the barbs and loops secure an article to be carried in place.

23. A carrier as defined in claim 22 further including side straps extending from opposite sides of the carrier having clips at free ends thereof for securing the carrier to the roof of a vehicle.

24. A carrier for supporting elongated articles as defined in claim 22 further including an elongated filler about which the support fabric is wrapped for maintaining the shape of the carrier while supporting an article.

25. A carrier for supporting elongated articles as defined in claim 22 further including side straps extending from opposite sides of the carrier having means at free ends thereof for securing the carrier to the roof of a vehicle.

* * * * *